US 8,226,868 B2

(12) United States Patent
Abad et al.

(10) Patent No.: US 8,226,868 B2
(45) Date of Patent: Jul. 24, 2012

(54) DEVICE AND METHOD FOR PREPARATION OF A PROFILED ELEMENT FROM AN ELASTOMERIC THERMOPLASTIC GEL

(75) Inventors: Vincent Abad, Chamalieres (FR); Luc Chebance, Aubiere (FR); Vincent Lemal, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/005,724

(22) Filed: Jan. 13, 2011

(65) Prior Publication Data

US 2011/0108186 A1 May 12, 2011

Related U.S. Application Data

(62) Division of application No. 12/339,152, filed on Dec. 19, 2008, now abandoned.

(30) Foreign Application Priority Data

Dec. 21, 2007 (FR) ..................................... 07 60255

(51) Int. Cl.
*B29C 47/88* (2006.01)
(52) U.S. Cl. ........... 264/178 R; 264/177.11; 264/211.12
(58) Field of Classification Search ............. 264/177.11, 264/178 R, 211.12
See application file for complete search history.

(56) References Cited

U.S. PATENT DOCUMENTS

| 1,740,029 | A | 12/1929 | Moomy | 264/180 |
|---|---|---|---|---|
| 4,122,137 | A | 10/1978 | Bohm et al. | 264/22 |
| 4,228,839 | A * | 10/1980 | Bohm et al. | 152/504 |
| 4,548,568 | A | 10/1985 | Herbert | 425/131.1 |
| 4,643,659 | A | 2/1987 | Paul | 425/131.1 |
| 4,892,473 | A | 1/1990 | Elia et al. | 425/197 |
| 5,071,913 | A * | 12/1991 | Powers et al. | 525/87 |
| 5,951,797 | A * | 9/1999 | Majumdar et al. | 156/96 |
| 6,397,910 | B1 * | 6/2002 | Losey et al. | 152/209.6 |
| 2002/0049276 | A1 | 4/2002 | Zwick | 524/476 |
| 2007/0149689 | A1* | 6/2007 | Wang et al. | 524/493 |
| 2008/0268272 | A1* | 10/2008 | Jourdain | 428/523 |
| 2009/0062497 | A1* | 3/2009 | Aul et al. | 528/8 |
| 2009/0191449 | A1* | 7/2009 | Yoshida et al. | 429/94 |
| 2009/0218018 | A1* | 9/2009 | Ikeda | 152/209.5 |

FOREIGN PATENT DOCUMENTS

| EP | 0 260 949 | 3/1988 |
|---|---|---|
| FR | 2 335 336 | 7/1977 |
| GB | 528335 | 10/1940 |
| JP | 59-196222 | 11/1984 |
| JP | 61-144311 | 7/1986 |
| WO | WO 97/09391 | 3/1997 |

* cited by examiner

*Primary Examiner* — Robert J Hill, Jr.
*Assistant Examiner* — Ninh Le
(74) *Attorney, Agent, or Firm* — Fitzpatrick, Cella, Harper & Scinto

(57) ABSTRACT

A device for preparing a flat profiled element from an elastomeric thermoplastic gel includes:
  an extruder with at least one feed and a discharge;
  an extruder die having section configured to be suitable for a profile of the flat profiled element;
  a liquid cooling bath with a free surface for receiving and cooling the flat profiled element as the flat profiled element is discharged from the extruder die; and
  a flat moving support for receiving the flat profiled element.
The free surface of the liquid cooling bath is arranged in an immediate vicinity of an outlet of the extruder die. Additionally, an angle of inclination of a plane of the extruder die to a horizontal plane is between 20 and 70 degrees.

7 Claims, 2 Drawing Sheets

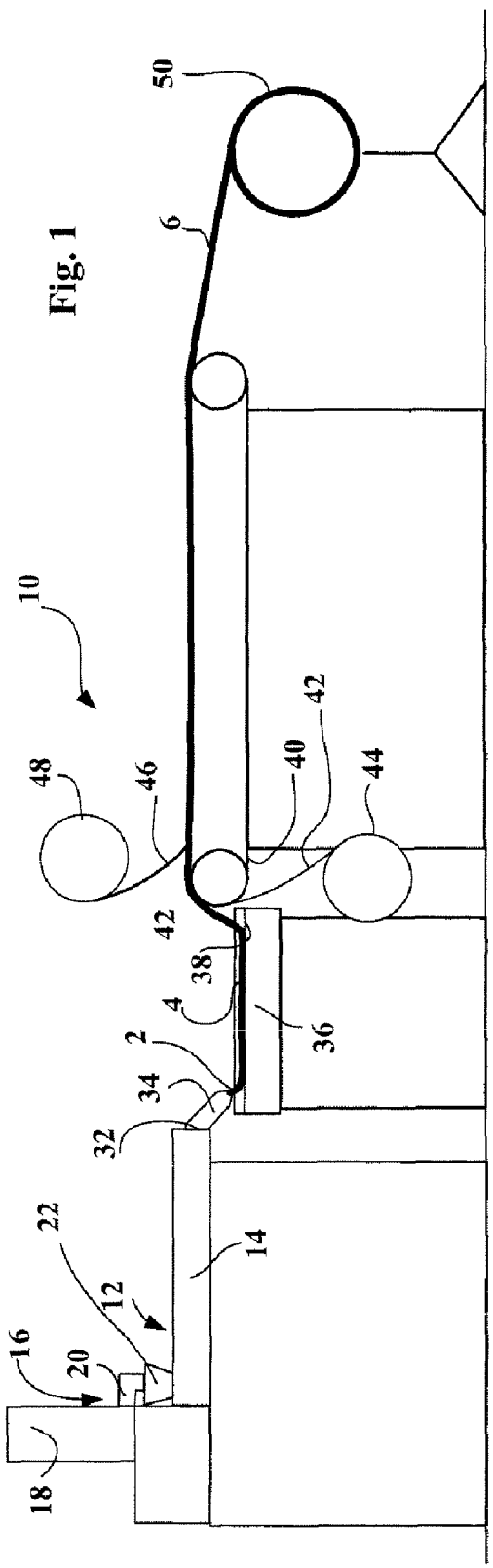
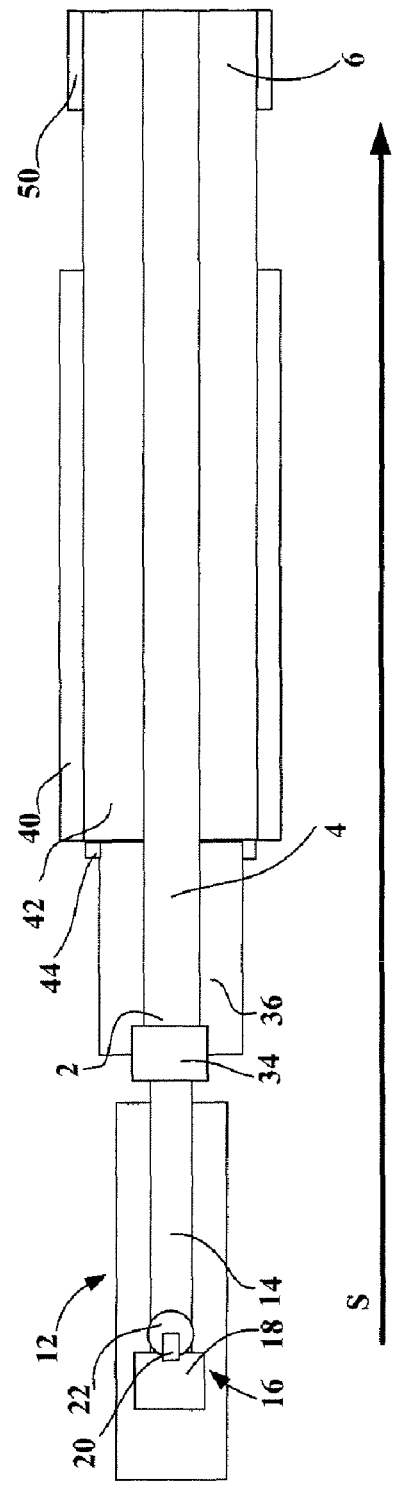

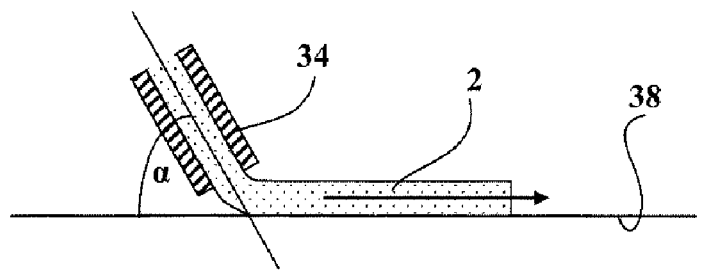
Fig. 3
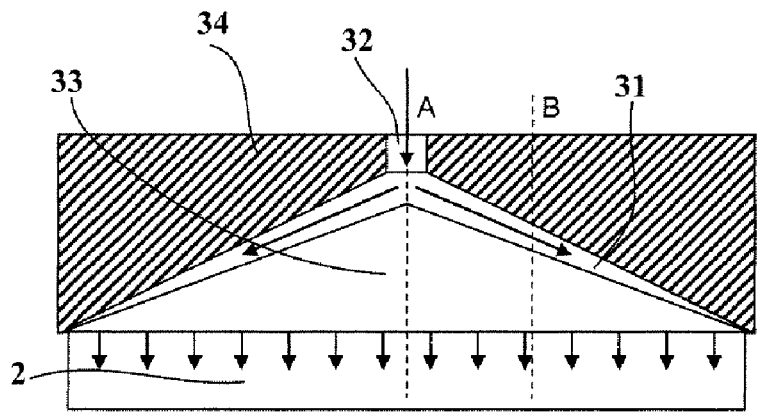 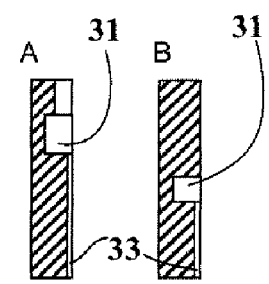
Fig. 4a  Fig. 4b  Fig. 4c
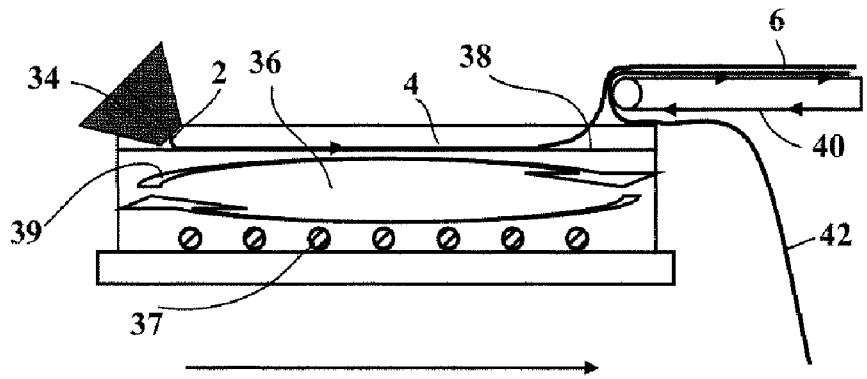
Fig. 5

DEVICE AND METHOD FOR PREPARATION OF A PROFILED ELEMENT FROM AN ELASTOMERIC THERMOPLASTIC GEL

CROSS REFERENCE TO RELATED APPLICATIONS

This application is a division of U.S. application Ser. No. 12/339,152 filed on Dec. 19, 2008 now abandoned, and claims priority of French patent application Ser. No. 07/60255 filed on Dec. 21, 2007. Each of these earlier applications is incorporated by reference herein in its entirety.

FIELD OF THE INVENTION

The present invention relates to a device and a method for preparation of a profiled element from an elastomeric thermoplastic gel.

TECHNOLOGICAL BACKGROUND

Elastomeric thermoplastic gels are materials characterized by a very low hardness, elastic behaviour, i.e., they regain their initial shape after deformation, even to a considerable extent of deformation, and a softening temperature beyond which they become plastic, which facilitates their application.

Such gels can notably have a matrix of styrene thermoplastic elastomers (called "TPS") such as the block copolymers styrene/butadiene/styrene (SBS), styrene/isoprene/styrene (SIS), styrene/butadiene/isoprene/styrene (SBIS), styrene/isobutylene/styrene (SIBS), styrene/ethylene/butylene/styrene (SEBS), styrene/ethylene/propylene/styrene (SEPS), styrene/ethylene/ethylene/propylene/styrene (SEEPS) and blends of these copolymers.

To achieve very low hardness, these gels also contain a high proportion of extender oils.

These gels can be prepared in two stages. In the first stage, the various constituents of the gel are fed, for example, into an extruder, which plasticates the thermoplastic elastomer and mixes it with an extender oil and any other desired additives. At the extruder's outlet, the plastic material is extruded for example into a rod, which is chopped to produce pellets or granules. To facilitate cooling of the plastic material, US Patent Application Publication 2002/0049276 states that extrusion and chopping of the rod can be carried out in water.

The granules or pellets can be stored. They are then reprocessed and injected into a mould to obtain their final forms.

However, this two-stage method of manufacture requires the use of antisticking agents to prevent the granules or pellets from sticking together. These antisticking agents have the drawback that they increase the hardness of the gels considerably.

PCT patent application publication WO 97/09391 proposes production of adhesives comprising a support and a thick elastomeric thermoplastic gel by extruding the plastic gel directly onto a support moving in translation. This manner of application can be used when the form ratio of the extrudate is close to one. This is no longer the case when it is desirable to obtain a flat profiled element, i.e., for which the thickness is much less than the width, and with controlled dimensions. It has been found that the low-viscosity plastic state of the material leaving the extruder die, i.e., the extrudate, and its very strong adhesiveness or stickiness, do not allow sufficient control of the dimensions of the flat profiled element in such an application.

U.S. Pat. No. 1,740,029 proposes a method and a device for extruding a rubber-like tube for the manufacture of inner tubes, in which the material leaving the extruder die is received on the surface of a water bath intended for cooling it without deforming it and without allowing its surface to vulcanize. In this device, the axis of the extruder die is horizontal.

DESCRIPTION OF THE INVENTION

Hereinafter, the phrase "flat profiled element" refers to a profiled element for which the ratio of width to thickness is greater than 5.

Aspects of the present invention relate to a device for preparing a flat profiled element from an elastomeric thermoplastic gel. The device includes:
  an extruder with at least one feed and one discharge;
  an extruder die with a section configured to be suitable for a profile of the flat profiled element;
  a liquid cooling bath with a free surface for receiving and cooling the flat profiled element as the flat profiled element is discharged from the extruder die; and
  a flat moving support for receiving the flat profiled element.

This device is characterized in that the free surface is arranged in an immediate vicinity of an outlet of the extruder die and in that an angle of inclination of a plane of the extruder die to a horizontal plane is between 20 and 70 degrees. The plane of the extruder die is directed downwards.

These two characteristics of the device, i.e., the minimum distance between the outlet of the extruder die and the free surface of the cooling bath and a downward inclination of the plane of the extruder die between 20 and 70 degrees to the horizontal plane, are to permit a first stage of extrusion of the flat profiled element, i.e., priming stage, or start-up stage of the extrusion process.

The material to be extruded is an elastomeric thermoplastic gel that contains more than 200 pce of extender. The material is of a very low viscosity and is of a highly adhesive nature.

If the distance between the extruder die outlet is not minimal, i.e., it is not less than 50 mm or even 10 mm, the drop of the material being discharged from the extruder die due to the force of gravity is long enough to cause a notable, irreversible change in the geometry of the profiled element. It is then no longer possible to recover a precise, reproducible geometry. The material leaving the extruder die during start-up of the process also tends to accumulate under the extruder die without being directed towards the flat moving support. Start-up is thus not possible.

The angle of inclination of the extruder die is also very important. When the angle α becomes too small, less than 20 degrees, for example, the almost liquid extrudate flows on the bottom edge of the extruder die and the flow can no longer be uniform. When the angle is too high, greater than 70 degrees, for example, the flow geometry is no longer constant and the extrudate, which is of a consistency having a very low viscosity, tends to fall from the extruder die and to leave the flow zone by gravity. The extrudate, moreover, no longer has enough kinetic energy to extend progressively during start-up towards the moving support. The angle of inclination is preferably between 30 and 60 degrees.

The proper combination of an angle within the stated range and a minimum distance between the free surface and the extruder die outlet is therefore essential for the extrudate leaving the extruder die to be received on the free surface of the liquid and to move progressively towards the moving support.

To facilitate start-up of the process, it is also advantageous for the liquid cooling bath to include means for stirring the liquid to generate a surface flow in the direction of movement of the flat profiled element on the liquid surface of the cooling bath. This has the advantage of facilitating the movement of the flat profiled element as far as the flat moving support during start-up of extrusion of the thermoplastic gel.

The stirring means also ensures a uniform temperature in the cooling bath.

The free surface of the liquid cooling bath has the advantage of receiving the low-viscosity plastic material leaving the extruder die and of very efficiently cooling its lower wall until it can preserve its shape. The flat moving support receives the flat profiled element at the end of the free surface of the cooling bath. The speed of movement of the flat support can be slightly greater than, equal to, or less than the speed of extrusion of the plastic material to provide fine control of the thickness of the flat profiled element. Cooling the low-viscosity plastic material on the free surface of a liquid cooling bath has the advantage of permitting such fine control owing to the complete absence of friction between the free surface and the flat profiled element. The very adhesive nature of the flat profiled element does not disturb these fine adjustments in any way. The length of the free surface is such that the flat profiled element has a temperature that is low enough for the shape of the profiled element to be properly fixed.

Preferably, the liquid cooling bath is cooled, for example by passage of a cooled fluid in a coil arranged in the liquid cooling bath near the free surface of the cooling bath.

One cooling liquid that can be used is water. However, many other liquids can be used instead, provided their density is greater than that of the elastomeric thermoplastic gels that are to be used and provided they do not adversely affect the material by causing dissolution, causing swelling, or by leaving deposits.

The invention also relates to a method of production of a flat profiled element from an elastomeric gel, having components or constituents of at least one thermoplastic styrene elastomer (called "TPS") and more than 200 pce of an extender oil, by an extruder with at least one feed and one discharge. The method includes steps of:
  introducing the components or constituents of the profiled element into the at least one feed of the extruder;
  plasticating and mixing the constituents to obtain a homogeneous plastic material;
  distributing the plastic material at a discharge of the extruder with an extruder die having a section configured to be suitable for a profile of the flat profiled element;
  cooling the plastic material to obtain the flat profiled element; and
  receiving the profiled element on a flat moving support.

This method is characterized in that the cooling stage includes:
  extruding the plasticated material in air; and
  receiving and conveying the plasticated material on a free surface of a liquid cooling bath.

Preferably, the extruder has at least one feed for solid components or constituents and at least one feed for liquid components or constituents, the components introduced into the feeds are elementary components or constituents of the flat profiled element. The device, according to an aspect of the present invention, is particularly suitable for carrying out the formulation and the production of a flat profiled element in a single operation. This means it is unnecessary to use anti-sticking agents, and the flat profiled element can thus retain all its properties of adhesiveness and low hardness.

Preferably the flat profiled element is received on a non-stick backing, siliconized or sulphurized, for example, arranged on the flat moving support.

It is advantageous for the external surface of the flat profiled element also to be protected by means of a non-stick backing, siliconized or sulphurized, for example.

The amount of extender oil in the elastomeric gel can advantageously be greater than 500 pce. A preferred range is between 500 and 1000 pce.

A preferred extender oil is polyisobutylene, which is notable for its application as a self-sealing layer in a pneumatic tire.

BRIEF DESCRIPTION OF THE DRAWINGS

Details regarding embodiments of the present invention are given in the following description, supplemented with FIGS. 1 to 5, in which:
  FIG. 1 shows a side view of a device for preparation of a flat profiled element according to an embodiment of the invention;
  FIG. 2 shows a top view of the device of FIG. 1;
  FIG. 3 shows a side view of an extruder die of the device of FIG. 1;
  FIGS. 4a, 4b, and 4c show a top view and partial sections of the extruder die of the device of FIG. 1;
  FIG. 5 shows a sectional view of a cooling bath.

DETAILED DESCRIPTION OF EMBODIMENTS OF THE INVENTION

FIGS. 1 and 2 schematically show, in side view and top view, respectively, a device 10 for preparing a flat profiled element from an elastomeric thermoplastic gel.

The device 10 includes an extruder 12, which advantageously may be a twin-screw extruder, for example, a cooling bath 36, a conveyor 40, and a storing unit 50.

In an embodiment of the present invention, the extruder 12 has two co-rotating screws housed in a barrel 14. At least two feeds, the first feed 16 for feeding solid constituents of the thermoplastic gel and another feed (not shown) for feeding liquid constituents of the thermoplastic gel, are provided for feeding the constituents of the thermoplastic gel into the barrel 14. The feed 16 is used for introducing the solid constituents in the form of granules or powders. The feed includes a reservoir 18, a barrel 20 for two feed screws, and a hopper 22. The liquid constituents of the gel are usually introduced downstream of the first feed 16.

At an outlet 32 of the barrel 14 of the extruder 12 there is an extruder die 34 with dimensions matching the dimensions of the expected or desired flat profiled element.

In an embodiment, the cooling bath 36 is filled with cooled water.

The free distance between an outlet of the extruder die 34 and a surface 38 of the cooling bath 36 preferably is as small as possible in order to permit uniform application of the almost liquid extrudate onto the surface 38 of the bath 36. A distance of less than 15 mm is useful, and a distance as low as about 5 mm can be used. It is desirable to avoid any contact between the water and the bottom of the extruder die 34 so as not to disturb the thermal equilibrium of the extruder die.

According to an embodiment, the conveyor 40 is an endless conveyor belt with two rolls 44 and 48 of backing material 42 and 46. The backing material 42 is used for protecting a lower face of the flat profiled element and the backing material 46 is used for protecting an upper face thereof (note that the backing material 46 and the roll 48 are not shown in FIG. 2 for reasons of clarity).

In an embodiment, the storing unit 50 is a storage roll of the flat profiled element 6 covered with backing material on each side.

The arrow S in FIG. 2 indicates the direction of movement of material.

FIG. 3 shows, schematically, a sectional view of the outlet of the extruder die 34. The extrudate 2, material that is plastic and of low viscosity in the extruder die 34, is extruded from the latter and is received at the surface 38 of the cooling bath 36. The arrow indicates the direction of movement of the material. The axis of the extruder die 34 makes an angle α with a horizontal plane, as shown.

FIG. 4a schematically shows a top view of a half-die, and illustrates the outlet 32 of the extruder 12 as well as a flow zone 33 of the elastomeric thermoplastic gel through the extruder die 34. As shown, a channel 31 adjacent to the outlet 32 (see also FIGS. 4b and 4c) makes it possible to distribute the viscous gel over the whole of the flow zone 33.

FIG. 5 is a sectional view of the cooling bath 36. The bath is preferably filled with water and includes a coil 37 through which a cooling fluid circulates to keep the temperature of the water below 30 degrees Celsius, for example. A stirrer (not shown) also is envisaged for ensuring movement to provide a uniform temperature in the bath 36, and the stirrer creates a surface current oriented in the direction of movement of the flat profiled element 4 on the surface 38 of the cooling bath 36. This movement is indicated by an arrow 39 in FIG. 5.

An operation of the device 10 according to an embodiment of the invention is as follows.

The elementary constituents of the elastomeric thermoplastic gel are introduced in the two feeds in the form of powder or granules for the elastomer (via the first feed 16) and in liquid form (of varying viscosity) for the extender oil (via the second feed).

The barrel 14 is heated to permit the combined mechanical and thermal effects of plasticating the elastomer and of obtaining a homogeneous, viscous plastic material. The temperature inside the barrel 14 can range from 200 to 320 degrees Celsius. At the outlet 32 of the extruder 12, the extrudate 2 is in nearly liquid form and has a viscosity slightly higher than the viscosity of water. The extrudate 2 is then extruded in the extruder die 34, which distributes it so as to obtain a flat profiled element of suitable dimensions. The temperature at the outlet of the extruder die 34 can still be of the order of 180 to 220 degrees Celsius. Fine temperature adjustments of various parts of the extruder die 34 provide fine control of the geometric uniformity of the flow at the outlet of the extruder die 34.

The extrudate 2 discharged from the extruder die 34 is received by the surface 38 of the cooling bath 36 and gradually travels along the bath 36, cooling as it does so. The cooling of the water of the cooling bath 36 is controlled so that the temperature of the water does not exceed 30 degrees Celsius. Uniformity of the temperature of the bath 36 is also maintained, as already described.

At the end of the cooling bath 36, the temperature of the flat profiled element 4 is close to 30 degrees Celsius and the flat profiled element now has elastic properties. The flat profiled element is still particularly sticky. It is then received on the conveyor belt 40, on which the lower backing material 42 is unwound. The external surface of this backing material 42, in contact with the gel, is a non-stick, siliconized or sulphurized paper, for example. The speed of travel of the conveyor belt 40 can, as is well known by a person skilled in the art, be slightly greater than, equal to, or even slightly less than the discharge speed of the flow from the extruder die 34, for fine control of the thickness of the flat profiled element 4.

During transfer on the conveyor belt 40, the backing material 46 can be applied on the upper face of the flat profiled element to protect it during storage. Finally, for storage, the protected profiled element 6 is wound on a reel 50.

Tests were carried out using a SEBS (marketed by Kraton Polymers), G1654 as the elastomer, and polyisobutylene Dynapak 190 or PIB as the extender oil. The proportion of PIB to elastomer was 85% to 15%. The PIB used in this proportion leads to a particularly adhesive nature of the resulting gel. The method and the device, according to aspects of the invention, permitted the mixing and production of a flat profiled element with various dimensions, up to 400 mm wide and from 1 mm to 4 mm thick. The uniformity of the flat profiled element obtained was excellent. The device, according to aspects of the invention, makes possible the control and fine adjustment of the thickness of the flat profiled element during the first part of its cooling without disturbance by the very adhesive nature of the resulting gel.

After storage, the flat profiled elements obtained can be cut to size and can be used as a semi-finished product for the manufacture of pneumatic tires. Notably, in a conventional manner, we can first apply a flat profiled element of thermoplastic gel on a building drum and then apply all of the other constituents of the tire, and subsequently vulcanize the tire obtained. The layer of elastomeric gel is thus arranged on the inside surface of an envelope cavity of the tire. This layer has remarkable properties of self-sealing of tire punctures occurring during running or use.

The layer can also be applied between two layers of rubber-like compound. The layer of self-sealing thermoplastic gel is then arranged inside the structure of the tire obtained.

Finally the flat profiled element can be applied directly on the inside surface of the pneumatic tire after vulcanization thereof, taking advantage of its remarkable adhesive character.

The invention is not limited to the examples described and illustrated herein, and various modifications can be made to these examples while remaining within the scope defined by the appended claims.

The invention claimed is:

1. A method of producing a flat profiled element from an elastomeric gel, the method comprising steps of:
arranging an extruder, such that an extruder die of the extruder is inclined at an angle between 20 and 70 degrees relative to a horizontal plane;
introducing into at least one feed of the extruder constituents of an elastomeric gel, the constituents including at least a thermoplastic styrene elastomer and between 500 to 1000 pce of polyisobutylene as an extender oil;
mixing the constituents to obtain a homogeneous plastic material;
distributing the plastic material at an outlet of the extruder die, the outlet of the extruder die having a flat opening;
arranging a liquid cooling bath to receive the plastic material from the outlet of the extruder die, such that a part of the cooling bath is less than 50 mm from the outlet of the extruder die;
extruding the plastic material, such that the plastic material as extruded from the outlet of the extruder die has a width-to-thickness ratio greater than 5;
cooling the extruded plastic material to obtain a flat profiled element; and
receiving the flat profiled element on a flat moving support.

2. A method according to claim 1, wherein the extruder includes a feed for solid components included in the thermoplastic styrene elastomer and a feed for liquid components included in the extender oil.

3. A method according to claim 1, wherein the flat profiled element is received on a non-stick backing material arranged on the flat moving support.

4. A method according to claim 3, wherein the non-stick backing material is siliconized or sulphurized paper.

5. A method according to claim 1, wherein a non-stick backing material is applied on an external surface of the flat profiled element.

6. A method according to claim 5, wherein the non-stick backing material is siliconized or sulphurized paper.

7. A method according to claim 1, further comprising a step of incorporating the flat profiled element in a structure or on a surface of a pneumatic tire.

* * * * *